Figure 1:
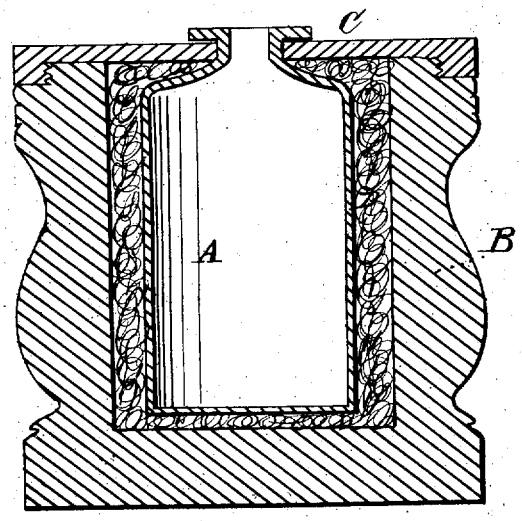
Figure 2:
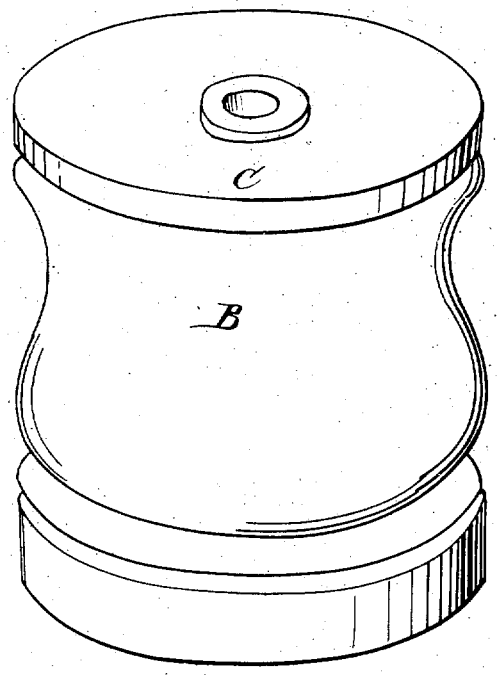

7651X

E. Southworth.
Inkstand.
Patented Jun. 29, 1833.

7651x

June 29, 1833 247

Ezra Southworth.

Letters Patent.

The schedule referred to in these Letters Patent and making part of the same containing a description in the words of the said Ezra Southworth, himself of his improvement in making Ink Stands To all whom these presents shall come -

Be it known that I Ezra Southworth of Saybrook in the County of Middlesex & State of Connecticut, have invented a new and useful improvement in making Ink stands viz -

Take a piece of wood of proper dimensions & turn, cut or carve it into any shape you chuse. then bore a hole of sufficient size to contain a Vial. then take a vial of proper dimensions to contain the ink. & place it in the wood, taking care to place around it cotton, wool. flax, hemp, or charcoal, or any other material which tends to prevent it from breaking or freezing then stop the hole with a piece of wood which completely incases the vial in wood, then paint, varnish, and bronze it, and you have an elegant and useful and durable ink stand, better than has heretofore been used The setting of the vials in wood, & securing them from breaking or freezing, by means of Cotton, wool, flax hemp, or charcoal, or any other material, which has that tendency I claim as an entirely new improvement in the making of ink Stands In testimony that the foregoing is a true Specification & Schedule of my improvement as above described I have hereunto set my hand, this 10th day of January A.D. 1833, Witnesses
Ezra C. L'Hommedieu
John L'Hommedieu Ezra Southworth Ex:
Ch.M 297 1480

Drawing